(12) United States Patent
Schaefer et al.

(10) Patent No.: US 8,082,059 B2
(45) Date of Patent: Dec. 20, 2011

(54) ORDER-PICKING METHOD AND ORDER-PICKING APPARATUS

(75) Inventors: Gerhard Schaefer, Neunkirchen (DE); Timm Gudehus, Hamburg (DE)

(73) Assignee: SSI Schaefer Peem GmbH, Graz (AT)

( * ) Notice: Subject to any disclaimer, the term of this patent is extended or adjusted under 35 U.S.C. 154(b) by 1037 days.

(21) Appl. No.: 11/453,251

(22) Filed: Jun. 15, 2006

(65) Prior Publication Data

US 2007/0043468 A1    Feb. 22, 2007

Related U.S. Application Data

(63) Continuation of application No. PCT/EP2005/005445, filed on May 19, 2005.

(30) Foreign Application Priority Data

May 19, 2004  (DE) .................. 10 2004 026 510
May 19, 2004  (DE) .................. 10 2004 026 511

(51) Int. Cl.
    *G06F 7/00* (2006.01)
(52) U.S. Cl. ...................................... 700/217
(58) Field of Classification Search ............ 700/217
     See application file for complete search history.

(56) References Cited

U.S. PATENT DOCUMENTS

| | | |
|---|---|---|
| 3,247,929 A | 4/1966 | Langley |
| 3,379,321 A | 4/1968 | Weir |
| 3,624,792 A | 11/1971 | Lipfert |
| 4,426,189 A | 1/1984 | Weber |
| 4,792,273 A | 12/1988 | Specht |
| 4,870,799 A | 10/1989 | Bergerioux |
| 5,352,081 A | 10/1994 | Tanaka |
| 5,943,841 A | 8/1999 | Wunscher |
| 2004/0243278 A1* | 12/2004 | Leishman ................. 700/214 |
| 2009/0010741 A1* | 1/2009 | Burgstaller et al. ......... 414/266 |

FOREIGN PATENT DOCUMENTS

| | | |
|---|---|---|
| DE | 41 04 527 A1 | 2/1991 |
| DE | 197 19 651 A1 | 5/1997 |
| EP | 0 839 113 B1 | 7/1996 |
| WO | WO 96/36547 | 11/1996 |

OTHER PUBLICATIONS

Charles G. Petersen II, An Evaluation of Order Picking Policies For Mail Order Companies, Production & Operations Management Society, 2000, pp. 319-335, USA 9, XP002345775, USA.

* cited by examiner

*Primary Examiner* — Ramya Prakasam
(74) *Attorney, Agent, or Firm* — McNeely, Hare & War LLP; Kevin J. McNeely (57) ABSTRACT

An order-picker order picks in an order-picking zone, with the result that the first number of order-picking zones is equal to the second number of order-pickers, and in that the order-picking computer sets the boundaries between adjacent order-picking zones in a variable manner by means of a zone-allocation strategy.

21 Claims, 8 Drawing Sheets

ORDER-PICKING METHOD AND ORDER-PICKING APPARATUS

BACKGROUND OF THE INVENTION

The present invention relates to a method of order-picking articles from a first number of providing sections into a corresponding number of order-depositing sections by means of a second number of order-pickers, a respective order-picking zone being formed by a providing section, in which a certain range of articles is provided, and an order-depositing section, on which articles which are put together for an order from the range of articles are deposited, this resulting in the formation of a first number of order-picking zones which, together, form an order-picking region, and an order-picking computer (also referred to as an order-picking master computer) for the order-picking zones generating zone orders in each case and communicating these to the order-pickers.

The present invention also relates to a corresponding order-picking apparatus which is suitable, in particular, for implementing the method.

Order-picking is the operation of putting together goods from a provided range of articles in accordance with predetermined orders. An order-picking system is intended to perform this task for a required throughput of articles or article units—also referred to as goods or picking units—with minimal use of personnel, and with short order-processing times, in as reliable, error-free and cost-effective a manner as possible.

The task of order-picking articles is a complex one, in particular when the overall range of the articles which are to be picked is heterogeneous, be this in respect of the shape of the articles, the popularity of the articles (fast movers, slow movers, etc.) and/or other criteria.

The possible technical alternatives for providing the access quantities, for moving the order-picker along, for picking the goods and for depositing the order quantities are well known in the art.

These basic principles are manifested in various configurations of order-picking systems, for example the classic order-picking machines. These are suitable for fast-moving articles which can be handled in an automated manner, for example cuboidal boxes or the like. The articles here are ejected from chutes onto a conveying belt in an automated manner, being controlled by an order-picking computer, and thus put together to form customer orders.

If the range of articles also includes slow-moving articles and/or articles which are difficult to handle in an automated manner, or if the range of articles is heterogeneous overall, people are usually used for order-picking purposes. In addition to conventional, purely manual order-picking systems, there are order-picking systems in which the order-pickers are guided by an order-picking computer. This can be done, in the simplest case, by indicator elements. It is also possible, however, for the order-picker to have a terminal, in particular a wireless terminal such as a radio terminal, on which he receives instructions from the order-picking computer.

EP 0 839 113 B1 discloses an order-picking system with at least one such central belt for receiving articles which are to be put together in accordance with an order and picked from a store by order-pickers. The articles which are put together to form the order are transferred from the central belt (belt conveyor) into order containers at a transfer point. The order containers are transported away by means of a conveying installation.

A multiplicity of intermediate-storage containers arranged one beside the other are arranged above the central belt. The intermediate-storage containers are intended for temporarily receiving articles which make up a respective order, and can be emptied onto the central conveyor in an automated manner with control by means of an order-picking computer.

The order-picking system, furthermore, is designed for employing a number of order-pickers. A respective order-picking zone (referred to as order-picking region in the relevant document) is defined by a predetermined number of intermediate-storage containers arranged one beside the other. The order-picker is guided into the store by means of a radio terminal. Each order-picking zone here is assigned a predetermined number of product types in the store.

A similar system is described in WO 96/36547. This document proposes that an order-picker be controlled by a central order-picking computer so as to move progressively along the intermediate-storage containers (or along the region-specific conveyor).

Document EP 0 839 113 B1, in contrast, proposes that the control computer be intended for guiding each of the order-pickers, via the radio terminal, not just into an associated dedicated order-picking zone but also into at least one supplementary order-picking zone adjacent to the associated order-picking zone.

This is intended to achieve the situation where the efficiency of the system remains unaffected, in practice, by differences in the efficiencies of the individual order-pickers and/or their workloads. It is considered to be particularly preferred here if an order-picker, when his neighbor is overloaded, can go into his neighbor's providing section (storage region) in order to "help out". The system is thus intended to be capable of taking into account differences in the personal distribution times of an order-picker in that it can automatically divide up the work between adjacent order-pickers.

In other words, when one order-picker is overloaded, an order-picker from a neighboring zone is guided into the order-picking zone of the overloaded order-picker in order to reduce the overloading there.

It is also proposed here, as an alternative, to guide the "helping-out order-picker" to the order-depositing sections of the overloaded order-picker or both to the providing sections and the order-depositing sections of the overloaded order-picker. It turns out to be particularly preferred, however, if the order-picker who is helping out is guided into the providing section (storage region) of the overloaded order-picker.

The meaning of this strategy is explained by way of a simulation in EP 0 839 113 B1. It can be gathered from the simulation that, in relation to a simulated overall working time of 5 hours×20 order-pickers=100 hours, a saving of 1.09 hours is achieved over a simplified strategy. This means that the order-picking strategy proposed in this document achieves an improvement of 1% in relation to an order-picking system in which each order-picker remains in his order-picking region (order-picking zone in the terms of the present application).

BRIEF SUMMARY OF THE INVENTION

Taking this as a background, the object of the present invention is to specify a considerably more efficient order-picking method and a considerably more efficient order-picking apparatus.

In respect of the order-picking method mentioned in the introduction, this object is achieved in accordance with a first aspect of the invention in that in each case only one order-picker order-picks in an order-picking zone, with the result that the first number of order-picking zones is equal to the second number of order-pickers, and in that the order-picking computer sets the boundaries between adjacent order-picking zones in a variable manner by means of a zone-allocation strategy in order to adapt the size of the order-picking zones in the order-picking region and/or the number of order-picking zones in the order-picking region to variable order-picking influencing factors, e.g. order-picking requirements.

In respect of the order-picking apparatus mentioned in the introduction, the above object is achieved in accordance with the first aspect of the invention in that in each case only one order-picker is arranged in an order-picking zone, with the result that the first number of order-picking zones is equal to the second number of order-pickers, and in that the order-picking computer is designed for setting the boundaries between adjacent order-picking zones in a variable manner by means of a zone-allocation strategy in order to adapt the size of the order-picking zones in the order-picking region and/or the number of order-picking zones in the order-picking region to variable order-picking influencing factors.

The order-picking method according to the invention is considerably more efficient than the order-picking method which is proposed in EP 0 839 113 B1. This is because the order-picking method according to the invention is based on a strategy in which in each case only one order-picker works within an order-picking zone. This avoids waiting times and the need for covering relatively long distances. Moreover, in contrast to the prior art, it prevents the situation where two order-pickers get in each other's way. Ruling out such situations in which order-pickers get in each other's way additionally reduces the frequency of errors.

It is also the case in the prior art that the necessity for "helping out" in other order-picking zones will usually occur when the so-called fast movers form a "bottle-neck". This further increases the probability of order-pickers getting in each other's way and of the associated frequency of errors.

This is fully prevented by the concept of an order-picker working just in one order-picking zone in each case.

Furthermore, the order-picking computer is designed for setting the boundaries between adjacent order-picking zones in a variable manner by means of a zone-allocation strategy.

The basic idea for this resides in the fact that the order-picking workloads of the order-pickers usually vary to a relatively pronounced extent over the day. In almost all order-picking centers, there are short phases of working at relatively high capacity and relatively long phases during which the order-picking installation is not really working to full capacity.

In accordance with the present zone-allocation strategy, then, it is possible to shift the boundaries between adjacent order-picking zones so as to change the size thereof. This can take place, for example, when one order-picker is overloaded and the adjacent order-picker does not have a full workload. In this case, the order-picking zone of the order-picker who does not have a full workload is increased, in a manner controlled by the order-picking computer, and the order-picking zone of the overloaded order-picker is reduced.

The principle of each order-picker working just in his own zone, however, is maintained here.

If, on account of the overall system working well below its full capacity, only a relatively small number of order-pickers is necessary, it is also possible for the zone-allocation strategy to change the number of zones by shifting the boundaries between the zones.

If an order-picking region, which has for example ten order-picking zones, is working considerably below its full capacity, it is possible, for example, for only nine, eight, seven, six, etc. order-pickers to be working, a corresponding number of order-picking zones being formed. In this case, it would be possible, for example, for the entire order-picking region to be divided up into just five order-picking zones. The principle of each order-picker remaining in his zone and not crossing the boundary to an adjacent order-picking zone, however, is maintained here.

It can easily be seen from the above example that the efficiency of the order-picking method and of the order-picking system according to the invention can be increased to a considerable extent. In any case, it is possible to achieve a considerably higher efficiency than the one-percent increase in efficiency which is achieved in EP 0 831 113 B1.

The number of order-pickers is adapted to the current capacity requirement in a self-regulating manner by the system-control means.

The order-pickers each work in a separate region, which requires only very short distances to be covered, without getting in each other's way and with a uniformly high workload.

Short order-processing times can be achieved even during peak periods.

By providing for a clearly allocated order-picking zone, ruling out the situation where order-pickers get in each other's way and reducing the risk of mix-ups, it is possible to achieve a minimal error rate and maximum order-picking quality.

The above object is achieved in accordance with the second aspect of the invention by a method of order-picking from a provided range of articles, in accordance with predetermined orders, with the aid of an order-picking system, having:

a number $N_B$ of providing units $B_i$ which is determined by the extent of the range of articles, i.e. the overall number of articles, a number $N_A$ of order-depositing areas $A_i$ which depends on the maximum throughput and the number of orders which are to be processed simultaneously, a number $N_k$ of order-pickers who work in $N_K$ parallel order-picking zones, of which the number depends on the currently required throughput, the picking efficiency of the individual order-pickers and the operational strategies, and a conveying installation by means of which the picking units are conveyed away from the order-picking zones and, together with the picking units from other regions, conveyed to packing locations or for dispatch purposes, the order-picking process being initiated, controlled and monitored in accordance with certain operational strategies, and the interaction of the system components being coordinated and optimized in a targeted manner, comprising a dynamic order-picking zone formation, in the case of which sufficient adjacent providing locations are combined with sufficient adjacent depositing containers, to form an order-picking zone, for the sub-orders coming up in the individual order-picking zones to provide an order-picker with a full workload and by an associated order-picking system.

The object is thus achieved in full.

According to a preferred embodiment of the method according to the invention in accordance with the first aspect of the invention, the order-picking influencing factors include the order-picking efficiency of the individual order-pickers.

This means that the order-picking efficiency will be taken into account for dividing up the order-picking region into the order-picking zones of variable size. This can be measured, for example, by the number of "picks" per unit of time and person, by the number of orders completed, or the like.

Furthermore, it is advantageous if the order-picking influencing factors include the number of order-pickers available.

As has been mentioned above, if the system, for example, normally includes (a maximum of) ten order-picking zones, whenever only eight order-pickers are available then the number of order-picking zones would likewise be reduced to eight. In this case, of course, the order-picking zones become somewhat larger, with the result that the individual order-pickers have to cover greater distances. Nevertheless, the order-picking method thus adapts itself automatically to the order-picking influencing factors.

According to a further preferred embodiment, the ranges of articles in the order-picking zones are different and supplement one another to form an overall range.

This embodiment is based on the fact that the range of articles in one order-picking zone is not identical to the range of articles in another order-picking zone. This allows the number of articles in the overall range to be increased to a considerable extent. It may be the case, however, that a fair number of articles (e.g. fast movers) are present not just in one order-picking zone but in a number of order-picking zones, in order for the throughput to be distributed uniformly over the zones.

It is particularly preferred here if the order-picking influencing factors include the number of zone orders per unit of time.

In other words, if, on account of a current demand for certain articles from, for example, a certain order-picking zone, there is an increase in the number of zone orders for this order-picking zone per unit of time, the variable zone-allocation strategy can be used to reduce the relevant order-picking zone. In other words, part of this order-picking zone is then added to an adjacent order-picking zone.

According to a further preferred embodiment, the order-picking computer receives customer orders (that is to say external orders) and divides them up into a third number of zone orders (also referred to as sub-orders). In this case, the order-picking computer uses an order-allocation strategy to prioritize those customer orders of which the zone orders involve order-picking zones in which the order-depositing sections are working to below-average capacity.

In other words, if an order-depositing section of an order-picking zone is working to capacity, with the result that the order-picker in this zone first of all has to process the existing zone orders, the order-picking zones do not have distributed to them any customer order which includes a zone order for this one order-picking zone in which the order-depositing section is working to full, or more or less full, capacity.

This increases the throughput since the only customer orders processed are those which are also very likely to be able to be processed immediately by the relevant order-pickers.

If, in contrast, such a customer order involves an article from an order-picking zone in which the order-depositing section is working to full, or largely full, capacity, such a customer order is deferred in relation to other customer orders.

It is particularly preferred here if the order-allocation strategy is subordinate to the zone-allocation strategy in the manner of a cascade.

"Subordination" is usually to be understood in the terms of temporal subordination. This means that the order-allocation strategy is a short-term strategy which is subordinate to a medium-term zone-allocation strategy. In other words, commissioning zones are newly allocated in accordance with the zone-allocation strategy when the order-allocation strategy is insufficient to ensure a high throughput through the order-picking system. It could also be said that the zone-allocation strategy involves slower "regulation" than the order-allocation strategy.

According to a further preferred embodiment, the order-picking computer evaluates the popularity of the articles of the overall range by means of an occupancy strategy and compiles the ranges of articles from the individual order-picking zones in dependence on the result of this evaluation such that the workloads of the order-pickers are essentially uniform.

The popularity of articles changes over time. An article which is very popular today may already be "dormant stock" tomorrow or in a week's time.

Accordingly, the popularity of the articles is evaluated on a regular basis in order for the articles of the overall range to be divided up between the order-picking zones so as to achieve order-picker workloads which are as uniform as possible and a high throughput for the order-picking system.

It is particularly advantageous here if an article of which the popularity changes such that the workload of the order-picker in whose order-picking zone the article is present changes by more than a certain threshold value in relation to the average workload of the order-pickers is assigned, by the order-picking computer, to another order-picking zone.

In this case, the remaining stock of this article in this order-picking zone would be processed and new articles of this type would be allocated to another order-picking zone (possibly one which was not working to full capacity up to this point) and supplied there.

It is particularly advantageous here if the zone-allocation strategy is subordinate to the occupancy strategy in the manner of a cascade.

The occupancy strategy here is generally based on a normal case, that is to say a certain normal occupancy of the order-picking system. If, for example, the system has been optimized to an occupancy with eight zones, i.e. eight order-pickers, the attempt would first of all be made, within the context of the higher-order occupancy strategy, to utilize the capacity of these zones as uniformly as possible by distributing the articles in accordance with their popularity. If, during operation, one article is requested a lot over the short term, such a peak may possibly be "compensated for" by means of the zone-allocation strategy. If this article turns out to be more popular on a permanent basis, this would result in permanent overloading of the relevant order-picker. Accordingly, this article would then be allocated, on account of the occupancy strategy, to the providing section of another order-picking zone. If this article constitutes a fast mover on a permanent basis, it is also possible for it to be supplied, within the zone, to a region with very short access paths, preferably a roll-through channel, which is arranged directly above the depositing point. In addition, the article may also be supplied in a further order-picking zone in order to achieve uniform distribution.

Overall, it is advantageous if at least one providing section has a through-passage channel, of which the front providing end is arranged in a depositing region of the order-picker.

As a result, the articles provided are provided to the order-picker in the order-picking zone in the region in which he also deposits the orders.

For example, such a through-passage channel may be arranged above or beneath, or even alongside, an order-depositing section.

It is particularly advantageous here if arranged in the providing sections is a fourth number of through-passage channels, at the rear supply end of which a supply aisle is arranged.

This means that articles which are to be provided can be supplied while order-picking continues uninterrupted at the other end of the through-passage channels.

The operations of supplying articles into the providing sections and of picking articles therefrom for order-picking purposes are thus separated from one another.

It is particularly advantageous here if a storage and retrieval unit is displaced in the supply aisle in a controlled manner by the order-picking computer in order for at least some of the articles of the overall range to be supplied in an automated manner.

The articles are thus supplied into the providing regions in a fully, or largely, automated manner. It can be assumed here that the articles are first of all retrieved from a larger store, for example also by means of a driverless transport system or the like, and then transferred to the storage and retrieval unit. The latter then performs the task of "refilling" the providing sections in an automated manner.

According to a further embodiment, which is particularly preferred overall, at least one order-depositing section has a fifth number of depositing containers (also referred to hereinbelow as intermediate-storage containers), which are each designed for receiving at least one article from the range of articles.

By virtue of intermediate-storage containers being provided, the order-picker can gradually make up an order even when he has to reach, or walk, into the providing section a number of times in order to do so. This measure can also be used to achieve the situation where a number of zone orders can then be combined comparatively easily to form a customer order.

It is thus particularly preferred if a region-specific conveyor is arranged beneath or above the intermediate-storage containers.

The region-specific conveyor here serves for conveying away zone orders or for combining zone orders to form a customer order or customer sub-order. The region-specific conveyor, for example in the form of a belt, may have both a virtual window, in which the sub-orders from the zones are consolidated, and mechanical separation by separating crosspieces, or it can also convey the order container directly.

It is particularly advantageous here, in turn, if the order-picking computer can select intermediate-storage containers and open them downward in an automated manner in order for the articles which are stored therein on an intermediate basis to be deposited onto the region-specific conveyor.

It is possible here, for example, to achieve synchronized opening of intermediate containers from a number of order-picking zones in order for the zone orders of a customer order to be deposited synchronously onto the region-specific conveyor. The latter can then easily combine the parts of the customer order.

It goes without saying that the region-specific conveyor here is preferably arranged beneath the intermediate-storage containers. It is also possible here for the region-specific conveyor to be arranged obliquely beneath the intermediate-storage containers, with the result that the articles can be transferred to the region-specific conveyor via a slide chute or some other oblique channel.

It is advantageous if the region-specific conveyor has a conveying belt. This can easily combine different zone orders to form a customer order.

It is thus particularly preferred if the region-specific conveyor is oriented parallel to an axis which is formed by the depositing regions of the order-pickers in the order-picking zones.

The region-specific conveyor may then be configured in one unit, for example by means of a single conveying belt, for an order-picking region (which comprises a number of order-picking zones).

Furthermore, it is advantageous if the order-picking computer activates the region-specific conveyor such that the articles which are deposited thereon are combined to form a customer order or part of a customer order.

It goes without saying that the zone orders of an order-picking region possibly involve just part of a customer order. An order-picking installation may possibly also have a further order-picking zone with a further order-picking region. Furthermore, it is possible to integrate in the order-picking installation further order-picking apparatuses which are based on a different technology, for example order-picking machines or the like.

It is particularly advantageous here if an order-container conveyor is oriented transversely to the region-specific conveyor, and if the order-picking computer activates the region-specific conveyor and the order-container conveyor such that the articles which are deposited on the region-specific conveyor are transferred into an order container positioned on the order-container conveyor.

The following advantages can be achieved overall.

The zone-allocation strategy can provide for optimum adaptation of a predetermined order-picking region comprising a number of order-picking zones to the order-picking capacity requirement or the number and the efficiency of the order-pickers.

By virtue of the occupancy strategy, the individual articles can be distributed over the order-picking zones, in accordance with their popularity, such that the throughputs and thus the amounts of work coming up are more or less equal. If the popularity of an article changes to such a pronounced extent that the equilibrium of the throughput distribution is disturbed by more than a threshold value (e.g. ±5%), the providing section thereof is shifted into another order-picking zone. This can take place, without transfer or rearrangement, following removal of the final unit of the stock of articles at the providing section which has been used up to this point.

By virtue of the order-allocation strategy, it is possible, following withdrawal of the parts of an order for which picking has been completed, for the order-picking computer to select from the most important customer orders of a customer-order stack, which has been organized in accordance with priority, the customer order of which the items (lines) do not involve any order-picking zone in which less than X of the intermediate-storage containers are free. The proportion X, which may be, for example, 20%, is a strategy parameter which makes it possible to achieve the desired utilization of capacity with a minimal number of containers.

The occupancy strategy achieves the situation where, in an order-picking zone, only seldom do more zone orders accumulate than there are intermediate-storage containers available. Should this be the case, then the attempt can first of all be made, using the zone-allocation strategy, to achieve more uniform utilization of capacity. For the rare case where even this is insufficient, the order-allocation strategy ensures that the order-pickers can work on in the overloaded order-picking zones without any waiting time being required.

The overall strategy provides a particularly efficient order-picking method and order-picking system which is far superior to conventional systems.

Of course, the features which have been mentioned above, and those which are still to be explained hereinbelow, can be used not just in the combination specified, but also in other combinations, or on their own, without departing from the framework of the present invention:

BRIEF DESCRIPTION OF THE SEVERAL VIEWS OF THE DRAWING

Exemplary embodiments of the invention are explained in more detail in the following description and illustrated in the drawing, in which.

DETAILED DESCRIPTION OF THE INVENTION

Figure 1:
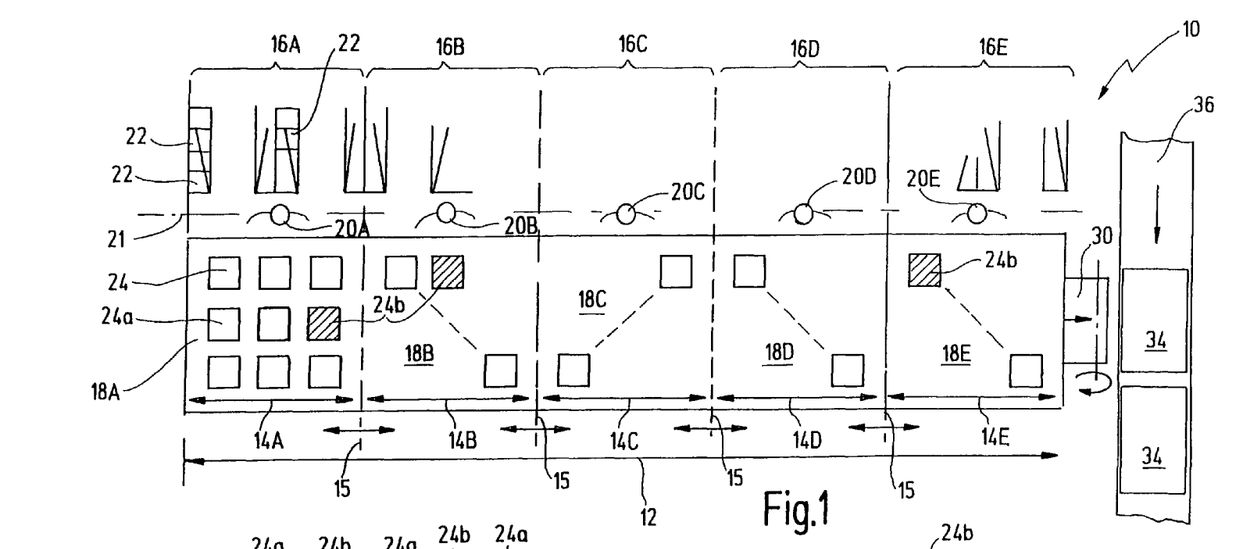
FIG. 1 shows a schematic plan view of an order-picking apparatus according to a first embodiment of the present invention, to be precise in accordance with the first aspect of the invention.
Figure 2:
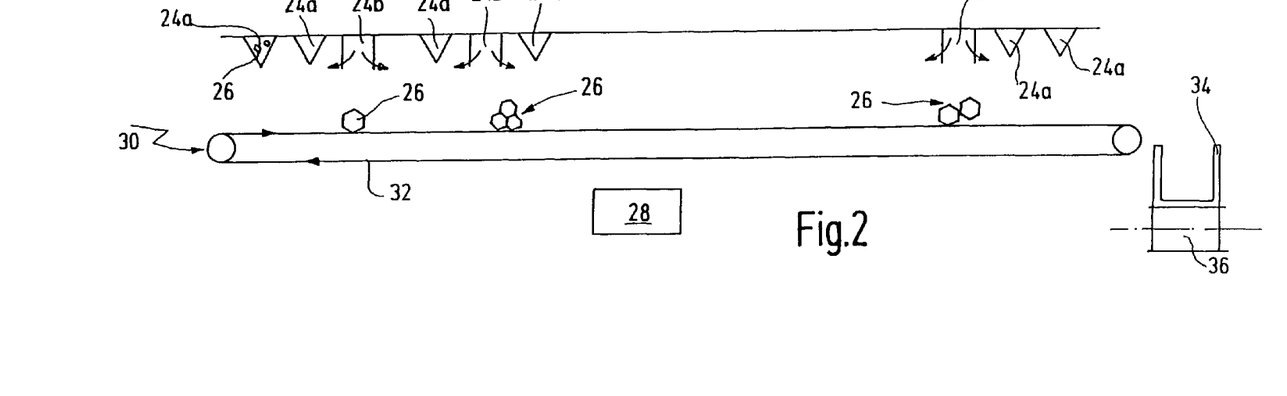
FIG. 2 shows a schematic side view of the order-picking apparatus from FIG. 1.

In FIGS. 1 and 2, a first embodiment of an order-picking apparatus according to the invention is designated in general terms by 10.

The order-picking apparatus 10 has an order-picking region 12, in which partially automated order-picking takes place.

The order-picking region 12 is subdivided into a number of order-picking zones 14, in the present embodiment five order-picking zones 14A-14E. The order-picking zones 14A-14E are separated off from one another by boundaries 15.

Each order-picking zone 14 has a providing section 16, in which articles which are to be picked are provided.

Furthermore, each order-picking zone 14 has an order-depositing section 18, on which an order, which is made up of a number of picked articles, is deposited for further processing.

Each order-picking zone 14A-14E is assigned an individual order-picker 20A-20E. The order-picking apparatus 10 does not make provision for an order-picker 20, as he is working, to cross the boundary 15 to an adjacent order-picking zone 14 if the adjacent order-picker is, for example, overloaded. This avoids two or more order-pickers being situated in one order-picking zone 14, which would doubtless result in them getting in each other's way, in conflicts and, ultimately, in an increase in the error rate. Instead, each order-picker 20 only receives orders (so-called zone orders) which involve retrieving one or more articles from the providing section 16 of his order-picking zone 14 and depositing the article or the articles of the zone order on the order-depositing section 18 of his order-picking zone 14.

It should be noted in this context that FIG. 1 gives a distorted picture as regards the relative sizes, in order to provide better clarity. Although the relative sizes of the order-picker 20 and providing section 16 are illustrated approximately on the correct scale in relation to one another, the order-depositing section 18 is illustrated on a considerably enlarged scale, in order for it to be possible to explain the order-picking apparatus according to the invention to better effect.

The order-pickers 20 are each shown, in their order-picking zones 16, at a depositing location, that is to say standing in front of the order-depositing section 18. The order-pickers 20 form an axis 21 here. It goes without saying that this axis usually runs in a rectilinear manner. However, it is also quite conceivable to provide for other topographical structures, such as curved or annular structures.

Each providing section 16 usually contains a number of providing locations 22, in which respective articles are provided for order-picking purposes. A range of articles is thus present in each providing section 16, it being possible for the order-picker 20 to put together zone orders from this range of articles.

In the simplest case, the ranges of articles in the order-picking zones 14 may be identical. However, the ranges of articles in the order-picking zones are usually different and combine to form an overall range.

Customer orders can be made up from articles from the overall range.

It may well be the case here that a fair number of articles are available not just in one order-picking zone 14 but in a number of order-picking zones 14. These articles are usually so-called "fast movers". Slow movers, in contrast, are usually only present in one of the order-picking zones 14.

Each order-depositing section 18 has a number of (in the present case, nine) intermediate-storage containers 24. In each case one or more articles 26 from the respective range of articles in the order-picking zone 14 can be stored on an intermediate basis in the intermediate-storage containers 24. The intermediate-storage containers 24 are usually designed for receiving the articles of an entire zone order of articles from the range of articles.

FIG. 2 illustrates that the intermediate-storage containers 24 can be opened in the downward direction. Closed intermediate-storage containers are designated 24a. An intermediate-storage container which is open downward or in the downward direction using a chute or in the lateral direction using a transfer belt is designated 24b.

A region-specific conveyor 30 is arranged beneath the intermediate-storage containers 24 of the order-depositing sections 18A-18E. The intermediate-storage containers 24 are arranged in relation to the region-specific conveyor 30 such that the articles 26 are deposited on the region-specific conveyor 30 from an open intermediate-storage container 24.

In the present case, the region-specific conveyor 30 has a conveying belt 32. The conveying direction of the conveying belt 32 is illustrated in FIG. 2 by arrows (toward the right in the illustration of FIG. 2). An order container 34 is arranged on this side of the region-specific conveyor 30. In the case of the present embodiment, the order container 34 can be transported further by means of an order-container conveyor 36

(for example likewise in the form of a conveying belt) once a customer order has been received from the order-picking region 12, either for dispatch purposes or in order for order-picking to be completed in further order-picking regions or from so-called order-picking machines.

The region-specific conveyor 30 is arranged transversely to the order-container conveyor 36.

This means that yet further order-picking regions 12 and/or order-picking machines or other types of order-picking apparatus or systems may be provided along the axis of the order-container conveyor 36.

In other words, a customer order or just part of a customer order, divided up into zone orders, is picked in the order-picking region 12 of the order-picking apparatus 20.

As has already been explained, the order-picking is partially automated. An order-picking computer 28 is provided for this purpose.

The order-picking computer 28 is in communication, on the one hand, with the order-pickers 20A-20E. This can be done, for example, by signaling devices such as lamps, indicators or the like being provided at the providing locations 22. It is also possible to provide suitable indicators, for assisting the order-picker 20, at the intermediate-storage containers 24.

As a further option, it is possible for each order-picker 20 to receive instructions via a terminal, for example a monitor, in the region of the order-picking zone. The terminal may also be, for example, a radio terminal which is carried on the arm in the manner of a wristwatch and on which the instructions for guiding the order-picker appear. Any other kind of wireless connection is also conceivable.

Furthermore, speech-controlled communication is also possible. In the simplest case, this may be a loudspeaker which is provided in all the order-picking zones and gives instructions such as "order-picker A to providing location 22*l*" or the like. It is also possible, however, to communicate corresponding instructions, for example, via radio and a headset specifically for each order-picker.

The order-picking computer 28 also controls the opening and closing of the individual intermediate-storage containers. In addition, the order-picking computer 28 controls the region-specific conveyor 30.

FIG. 2 illustrates completion of a customer order in the order-picking region 12. This means that all the order-pickers 20 whose order-picking zones 14 were involved in putting together the customer order have processed and acknowledged the respective zone orders. Corresponding acknowledgement buttons may be provided at the order-depositing sections or directly on the intermediate-storage containers 24.

As soon as all the order-pickers 20 involved have registered an acknowledgement, an order container 34 which is positioned on the order-container conveyor 36 is allocated to the customer order picked. The order-picking computer 28 then opens the intermediate-storage containers 24 into which the order-pickers 20 have picked the respective zone orders (instructed by the order-picking computer 28).

The articles 26 which are contained in the open intermediate-storage containers 24*b* pass on to the region-specific conveyor 30. The latter is activated by the order-picking computer 28, with the result that the articles 26 which are contained thereon are transferred, in a virtual or mechanically separated-off belt section or even by way of a sorter running beneath the intermediate containers, into the order container 34. This completes the customer order for the order-picking region 12 illustrated.

By virtue of the number of intermediate-storage containers 24 per order-depositing section 18, it is possible for an order-picker 20 to process a number of zone orders simultaneously.

The distances can thus be shortened to a considerable extent as a result. Furthermore, once the zone order has been completed, it is still possible for an intermediate-storage container 24 to remain occupied, despite acknowledgement having been registered by the respective order-picker, until the other zone orders which make up the customer order in question have likewise been acknowledged.

During operation, the order-picking computer 28 thus receives customer orders for the order-picking region 12 or allocates the part of a customer order to the order-picking region 12. The customer order (or the part thereof) is then divided up, in dependence on the articles 26 desired, into zone orders for the individual order-picking zones 14.

The zone orders are then communicated to the order-pickers 20 and the order-pickers process the zone orders.

It may be the case here that one order-picker involved has to retrieve, for example, just one article for a zone order. It may also be the case that another order-picker, on account of his range of articles, has to retrieve, for a given customer order, a number of articles while order-picking "his" zone order. It is also possible for one order-picker not to be as efficient as another. In addition, the popularity of the articles of the overall range varies over time. New articles are also added. Others are removed from the overall range. Also, for example over the course of a day, there are often phases during which a very large number of customer orders have to be processed in a short period of time. During other phases, the order-picking apparatus is not really working to full capacity. It may also be the case that order-pickers take a break, fall ill or are absent for some other reason.

In order to allow for at least one of these order-picking influencing factors and others, the order-picking method according to the invention includes a zone-allocation strategy.

Figure 3:
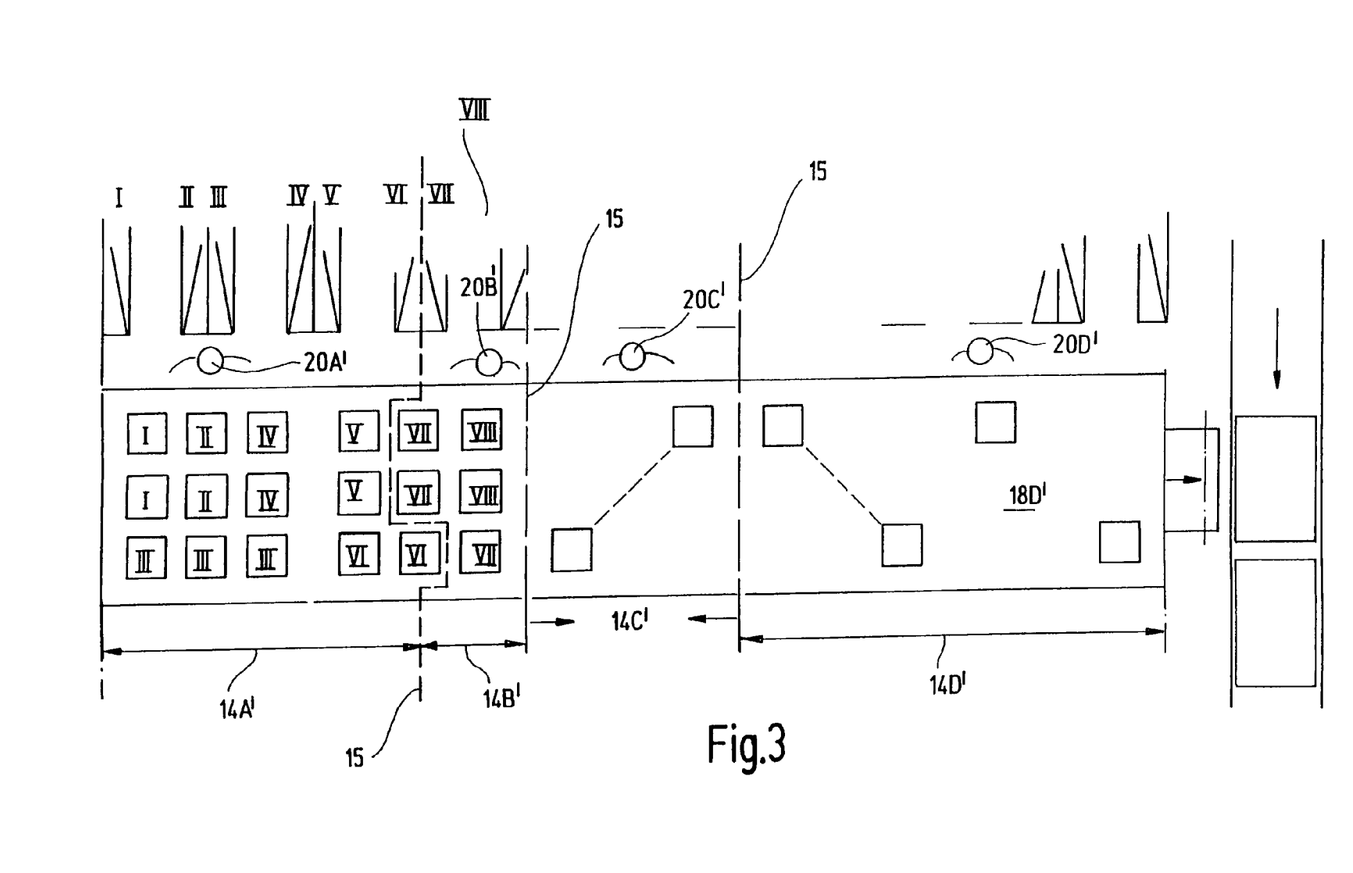
FIG. 3 shows a view of the order-picking apparatus which is comparable to FIG. 1, boundaries between adjacent order-picking zones having been shifted.
Figure 4:
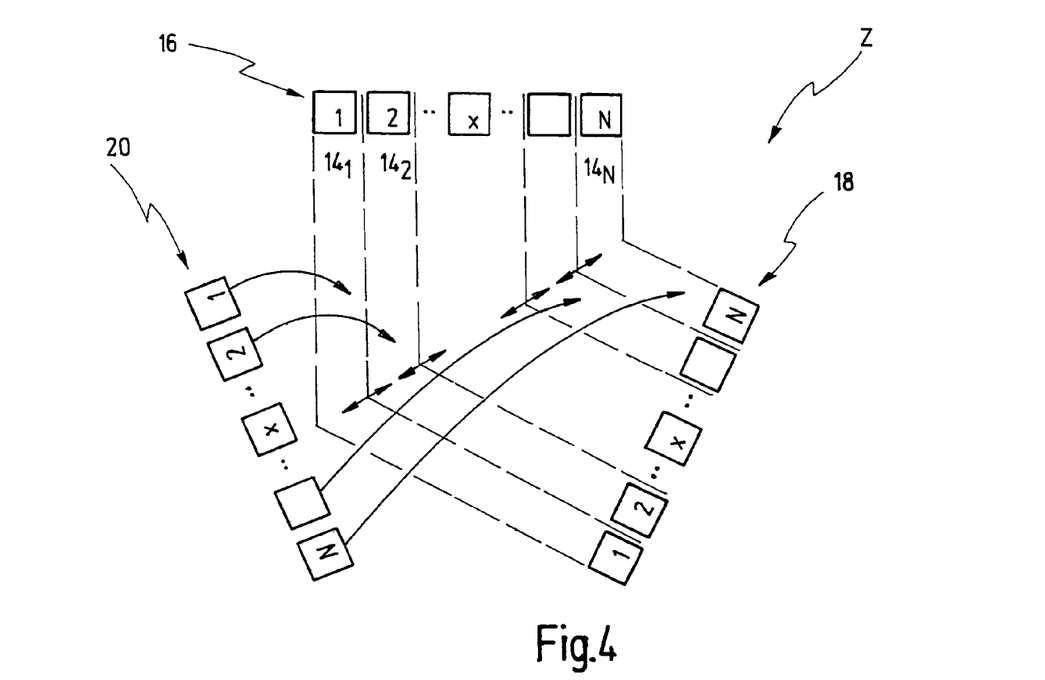
FIG. 4 shows a schematic illustration of an order-picking system for the purpose of explaining the order-picking method in accordance with the first aspect of the invention.
Figure 5:
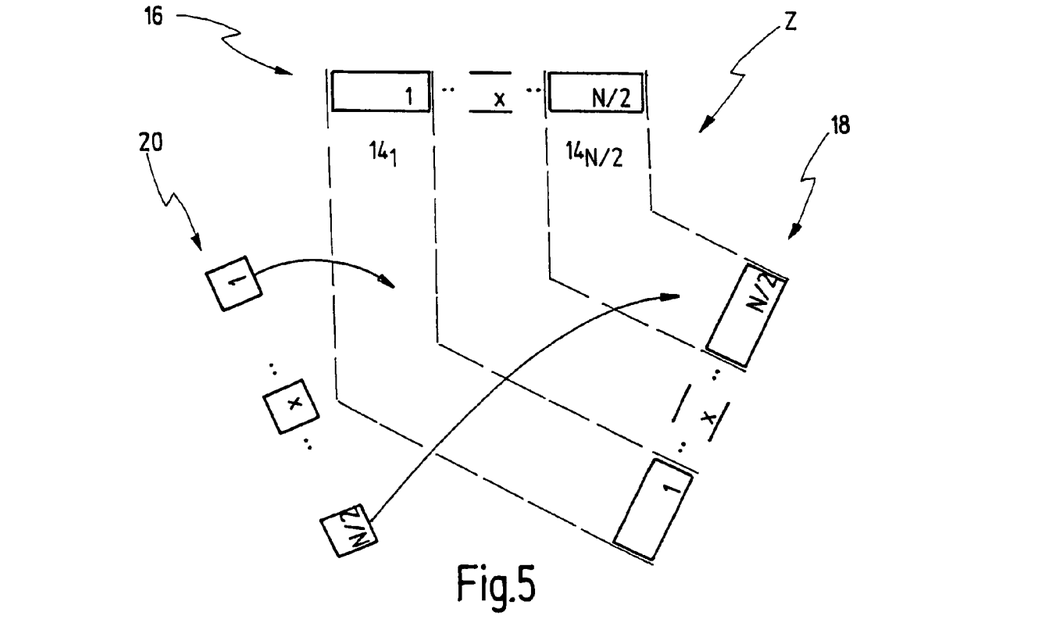
FIG. 5 shows a view which is comparable to FIG. 4 and in which the order-picking zones have been reduced by half.
Figure 6:
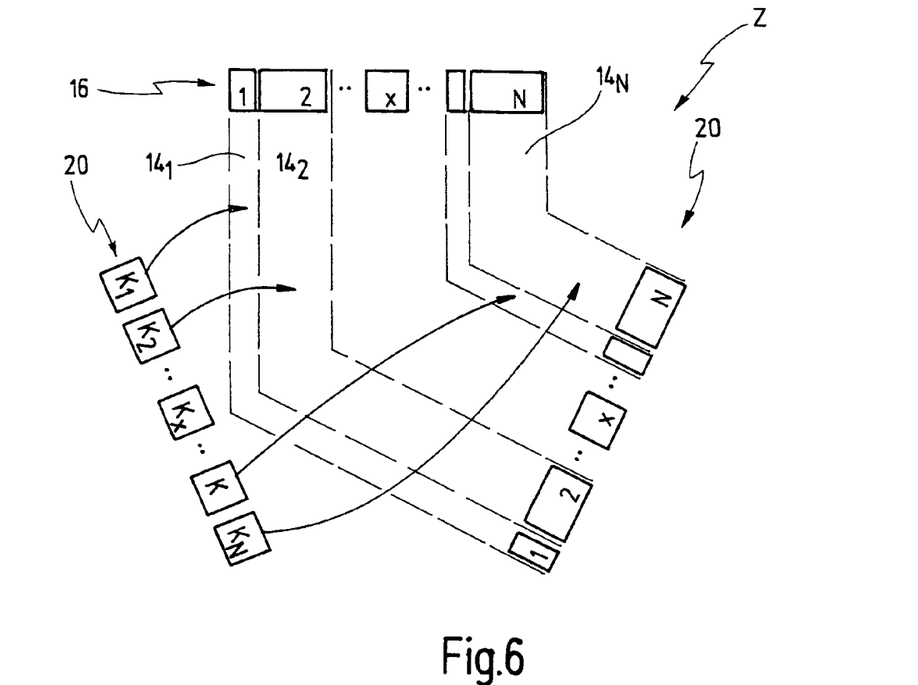
FIG. 6 shows a view which is comparable to FIG. 4, the number of order-picking zones remaining the same, but the size of the order-picking zones having changed.

This is illustrated schematically in FIG. 3 using the example of the order-picking apparatus from FIGS. 1 and 2 and in FIG. 4 to 6.

The zone-allocation strategy is designated Z in general terms and makes it possible to set the boundaries 15 between adjacent order-picking zones 14 in a variable manner in order to adapt the size of the order-picking zones 14 and/or the number of order-picking zones 14 to the variable order-picking influencing factors.

In the example of FIG. 3, one of the order-pickers 20D, 20E from FIGS. 1 and 2 is absent. The other order-picker, designated 20D' in FIG. 3, is now assigned to a new order-picking zone 14D', which includes the order-picking zones 14D and 14E from FIG. 1. The order-picker 20D' here receives zone orders, involving retrieving articles from the range of articles in the now considerably larger order-picking zone 14D' and deposits the picked articles in a now considerably enlarged order-depositing section 18D' with a total of 18 intermediate-storage containers 24.

The order-picking zone 14C' is identical to the order-picking zone 14C from FIGS. 1 and 2.

As an alternative, it would also have been possible for half of the order-picking zone 14D from FIG. 1 to be added to each of the order-pickers 20C' and 20D'.

FIG. 3, furthermore, shows that the order-picking zone 20A has increased to form the order-picking zone 20A', whereas the order-picking zone 20B' has become correspondingly smaller.

The boundary 15 between these two order-picking zones has shifted accordingly.

In order to allow an order-picking procedure which is largely free of conflict, this shifting in the order-picking apparatus 10 takes place as follows.

The providing sections 16 are subdivided into sub-sections I to VIII, etc. In the case of the division of zones from FIG. 1, the zone 14A was assigned sub-sections I to IV and the zone 14B was assigned sub-sections V to VIII.

On account of the boundary 15 being shifted, the zone 14A' now includes the sub-sections I to VI. The zone 14B' now includes just the sub-sections VII, VIII.

The boundary between the order-depositing sections 18A', 18B' has also shifted, as is illustrated clearly in FIG. 3.

In order to clarify this further, the individual intermediate-storage containers 24 of the zones 14A', 14B' have each been assigned part of the providing sections 16A', 16B'. It can be seen from this that, despite the unfavorable arrangement of nine intermediate-storage containers 24 (in practice, of course, an even number would be selected), the order-picking zones 14A', 14B' can be separated such that the order-pickers 20A', 20B' do not get in each other's way.

Such a zone-allocation strategy Z is illustrated schematically in FIG. 4 to 6.

In a first arrangement, N providing sections 16 and N order-depositing sections 18 are provided, as are thus N order-picking zones 14.

Also provided are N order-pickers 20, one order-picker 20 for each order-picking zone 14.

In FIG. 5, the number of zones has been reduced to N/2. Accordingly, the providing sections 16 and 18 have each doubled in size. Furthermore, only half the number of order-pickers 20 (N/2 order-pickers) is provided. Shifting the boundaries 15 thus makes it possible to vary the number of order-picking zones 14. FIG. 5 shows the number of order-picking zones halved. However, any other fraction is also possible. Furthermore, it is not necessary for the order-picking zones 14 to be of equal size in each case.

This is illustrated in FIG. 6. In FIG. 6, the number of order-picking zones is equal to the number of order-picking zones in FIG. 4, namely N order-picking zones. The relative sizes of the order-picking zones, however, have changed. For example, the order-picking zone $14_1$ is smaller, whereas the order-picking zone $14_2$ is larger. Correspondingly, the order-picking zone $14_N$ is larger, and the adjacent order-picking zone $14_{N-1}$ is correspondingly smaller.

Shifting the boundaries 15 between order-picking zones thus sets the size of these zones 14 in a variable manner.

In all cases, however, only one order-picker 20 works in an order-picking zone 14.

Figure 7:
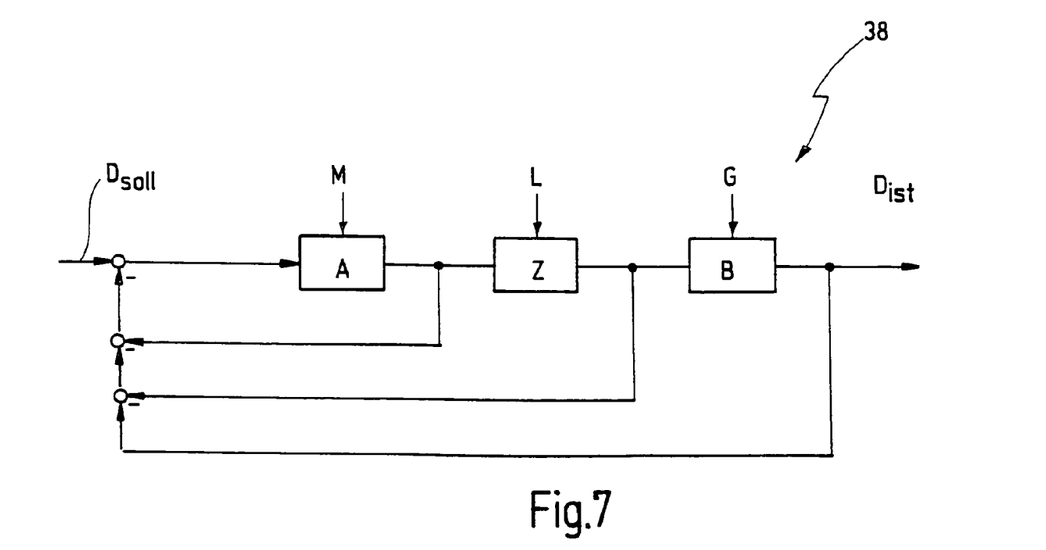
FIG. 7 shows a schematic illustration of a strategy cascade for one embodiment of the order-picking method in accordance with the first aspect of the invention.

FIG. 7 shows, in schematic form, a strategy cascade 38 which can be implemented in the order-picking computer 28.

The zone-allocation strategy Z, which has been described with reference to FIG. 4 to 6, is part of the overall strategy.

The main aim of the order-picking apparatus 10 is a high throughput D.

The strategy cascade 38 is illustrated in the manner of a multi-loop control circuit. The desired throughput is designated $D_{soll}$, and the actual throughput is designated $D_{ist}$.

The order allocation is influenced in an innermost "control loop". This can take place, for example, such that the order-picking computer 28 implements an order-allocation strategy A which prioritizes customer orders of which the zone orders involve order-picking zones 14 in which the order-depositing sections 18 have below-average occupancy.

In the case of the order-picking apparatus 10, a customer order is then divided up into zone orders and assigned to the order-pickers 20 when it has been ensured that, in each of the zones in question, there is a free intermediate-storage container 24 for processing the zone order. This is intended to avoid the situation where order-picking zones are used for responding to customer orders which are in any case already wholly or largely blocked by their intermediate-storage containers being occupied fully, or more or less fully, due to zone orders which have already been placed.

Furthermore, in the strategy cascade 38, the zone allocation is realized by a zone-allocation strategy Z in the order-picking computer 28. The order-allocation strategy A here is subordinate to the zone-allocation strategy Z, to be precise in the sense that the order-allocation strategy A can react comparatively quickly to changes in the zone orders being processed in the order-picking zones. The zone-allocation strategy Z is used if, over the medium term, an imbalance is established between order-picking zones or the number of order-pickers decreases on account of absence or the like. Of course, the zone-allocation strategy Z also becomes active when, on account of generally lower utilization of capacity, fewer order-pickers are used.

The zone-allocation strategy Z here is subordinate to an occupancy strategy B for occupying the providing sections 16 with articles.

The strategy B depends on the popularity G of the articles of the overall range. Over relatively long periods of time, for example days or weeks, this popularity of the articles is reevaluated and the ranges of articles in the individual order-picking zones 14 are compiled in dependence on this such that the workloads of the order-pickers 20 are essentially uniform.

The popularity G is illustrated in the strategy structure 38 as a "disturbance variable" for the occupancy strategy B. Similarly, L constitutes a disturbance variable in the form of order-picker efficiency or the number of order-pickers 20. The order-allocation strategy A is illustrated by way of a "disturbance variable" M in the form of the demand at any one time.

By virtue of the three strategies A, Z and B mentioned being superposed, it is possible to achieve a high throughput D for a given order-picking apparatus C.

Figure 8:
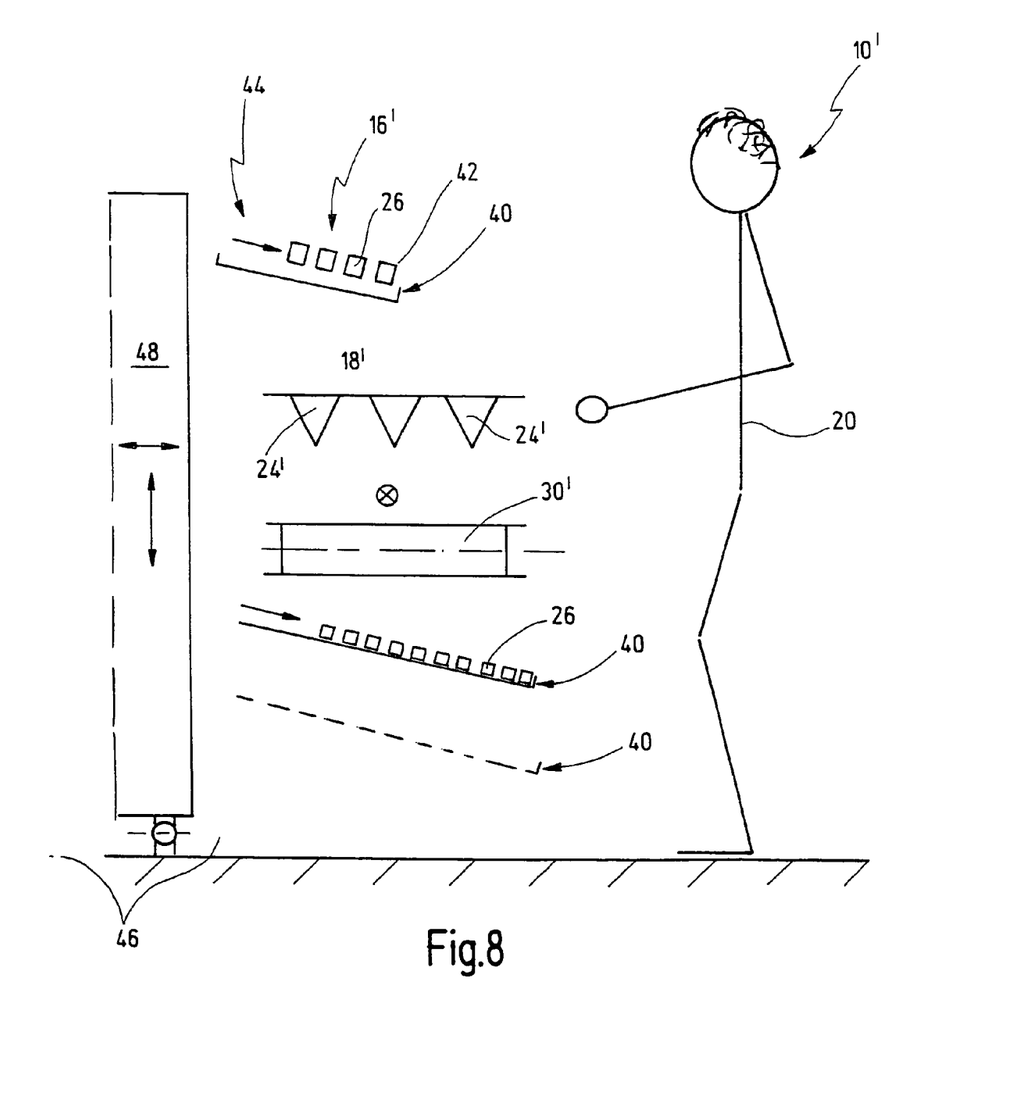
FIG. 8 shows a schematic side view of a further embodiment of the order-picking apparatus in accordance with the first aspect of the invention.

FIG. 8 shows an alternative embodiment of an order-picking apparatus 10' according to the present invention.

In terms of construction and functioning, the order-picking apparatus 10' corresponds in general terms to the order-picking apparatus 10 from FIG. 1 to 3. The same elements are thus specified by the same designations. Merely the differences are discussed hereinbelow.

While the providing sections 16 of the order-picking apparatus 10 from FIG. 1 to 3 are illustrated as shelving racks or the like which are spaced apart from the respective order-depositing sections 18, a providing section 16 of the order-picking apparatus 10 includes a number of through-passage channels 40. The through-passage channels 40 each have a providing end 42 which is arranged in the depositing region of the order-picker 20. An opposite, supply end 44 of the through-passage channels 40 terminates in the region of a supply aisle 46 in each case. In the supply aisle 46, supply staff can fill the through-passage channels 40 as required, to be precise from a usually considerably larger store.

It is, however, also possible for a storage and retrieval unit 48 to be displaced within the supply aisle 46, this unit supplying articles 26 in an automated manner into the providing section 16 or the providing sections 16 arranged one beside the other.

In the case of the order-picking apparatus 10', the order-picker can be essentially stationary as he works. Provision may also be made, however, for, for example, the providing section 16' to be wider than an associated order-depositing section 18'. In any case, the order-picker 20 in the order-picking apparatus 10 will move essentially in front of the arrangement comprising the providing section 16 and the order-depositing section 18 and need not, in particular, cover any distance into a separate supply store.

FIG. 9 to 12 illustrate an order-picking apparatus and a corresponding method in accordance with the second aspect of the invention.

Figure 9:
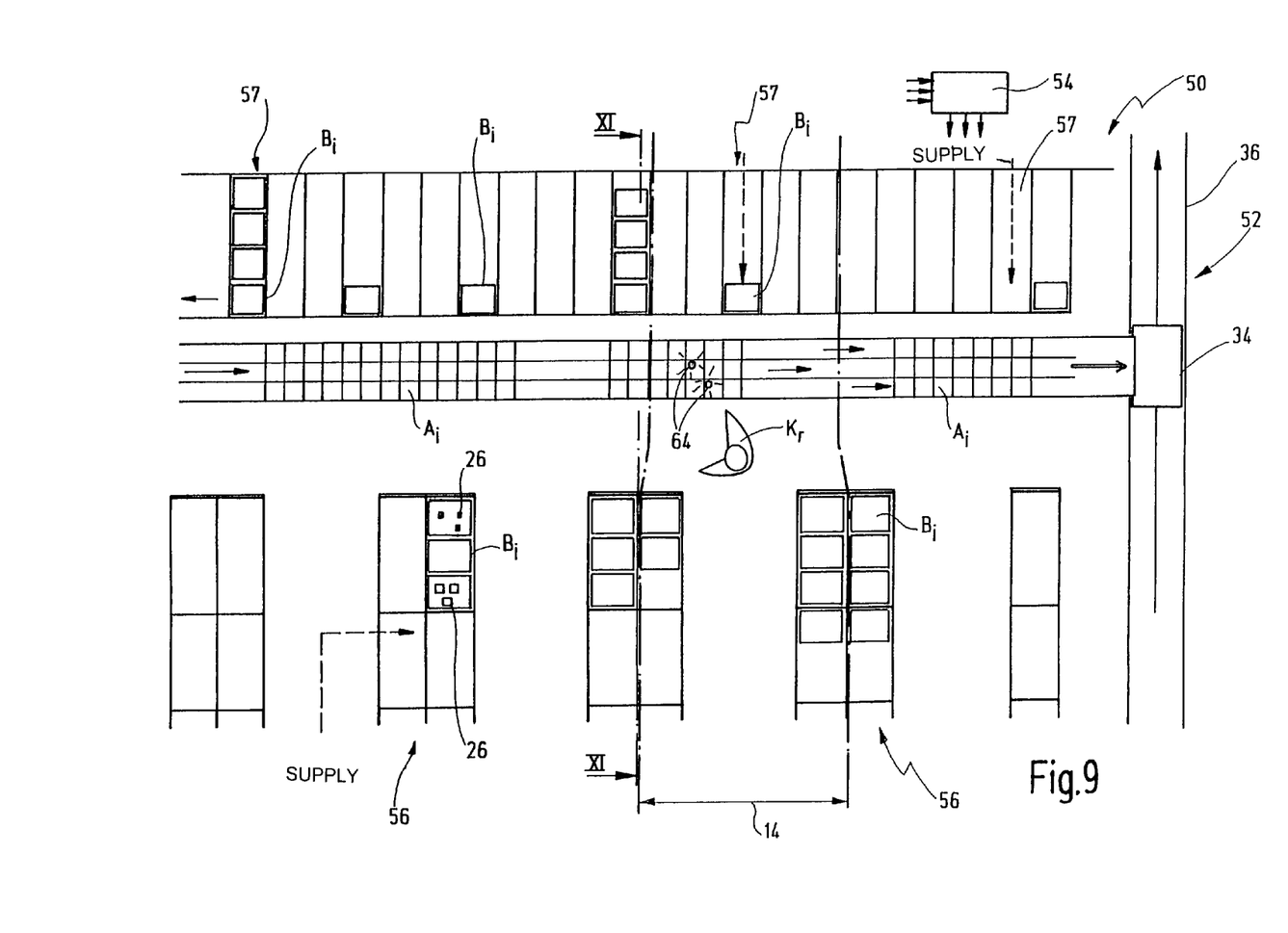
FIG. 9 shows a schematic plan view of an order-picking apparatus in accordance with the second aspect of the invention.
Figure 10:
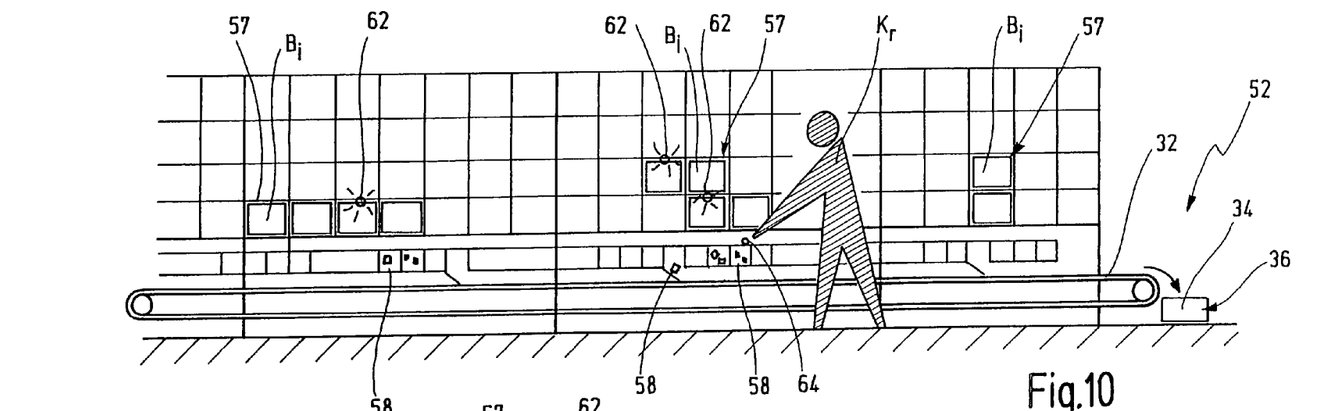
FIG. 10 shows a front view of the order-picking apparatus from FIG. 9.
Figure 11:
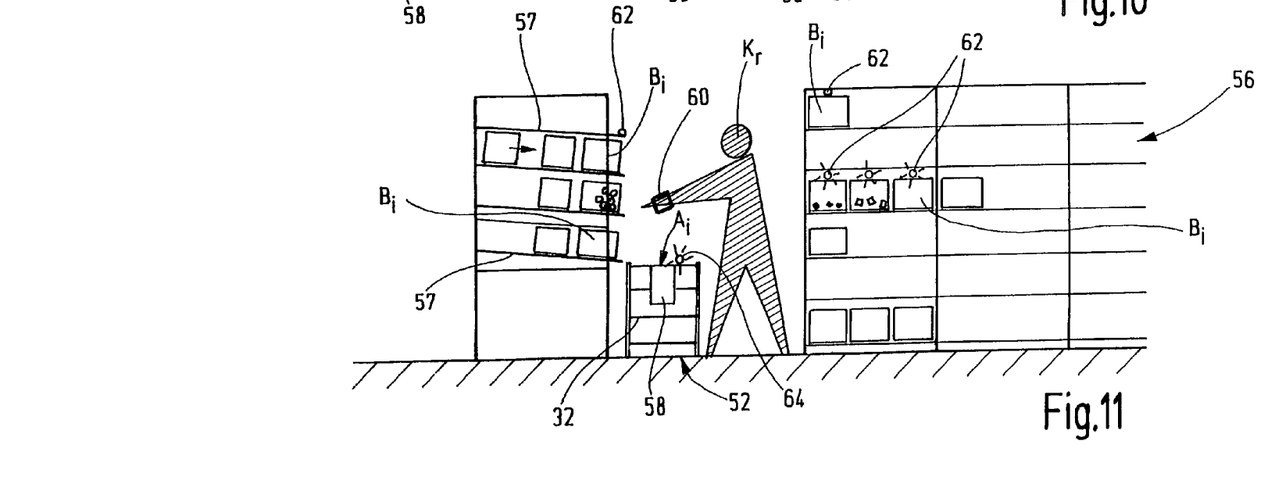
FIG. 11 shows a cross-sectional view of the order-picking apparatus from FIG. 9.

The order-picking apparatus 50 has:
1. a number $N_B$ of providing units 22 or $B_i$, where i=1, 2 ... $N_B$, which is determined by the extent of the range of articles, i.e. the overall number of articles 26,
2. a number $N_A$ of order-depositing areas 34 or $A_i$, where i=1 ... $N_A$, which depends on the maximum throughput and the number of orders which are to be processed simultaneously,
3. the order-picker 20 or $K_r$, where r=1, 2 ... $N_K$, who work in $N_K$ parallel order-picking zones and of which the number $N_K$ depends on the currently required throughput, the picking efficiency of the individual order-pickers and the operational strategies,
4. a conveying installation 52 by means of which the picking units are conveyed away from the order-picking zones and, together with the picking units from other regions, are conveyed to packing locations or for dispatch purposes,
5. the system-control means 54, which initiates, controls and monitors the order-picking process in accordance with certain operational strategies, and coordinates and optimizes the interaction of the system components in a targeted manner.

The article units or articles 26 are located, for example, loosely or in containers, as providing units 22, $B_i$, at access locations, from which the order-picker 20, $K_r$ removes the required picking quantity on the instructions of the system-control means. The access or providing locations $B_i$ are arranged within easy reach, for example, in racks 56 or in through-passage channels 57 as close as possible to the order-depositing areas 34, $A_i$.

The order-depositing areas 34, $A_i$ are preferably movable depositing containers, which are fed to the order-picking zones one after the other by the conveying installation, or stationary ejecting chutes 58 which are arranged one beside the other in order-picking zones 14 operating in parallel.

The picking units which make up an order are deposited, by the order-picker $K_r$, in the ejecting chutes 58, $A_i$, of which the bases can be opened mechanically in the downward direction. When the picking quantities which make up an order have been deposited in the associated depositing chutes 58, $A_i$ in all the order-picking zones 14, they are emptied onto the collecting conveyor 32 running beneath and are conveyed away (see FIG. 10) [6, 7, 8, 9].

The current removal (picking) locations and, if appropriate, quantities are specified to the order-picker $K_r$ by the system-control means either via stationary indicator lamps 62 fitted at the providing locations 22, $B_i$ (see FIG. 9, 10 or 11) or by a mobile terminal 60 which the order-picker $K_r$ carries along on his arm (hand-held display) or on an order-picking carriage, which also serves as an intermediate depositing area.

The depositing container or depositing chute 58, $A_i$ for the order which is currently being processed is indicated to the order-picker $K_r$, for example, by an indicator lamp 64 at the depositing location $A_i$ or likewise via the mobile terminal 60. The removal and depositing operations are also acknowledged by the order-picker $K_r$ at the stationary indicators 62, 64 or via the mobile terminal 60. It is also possible to specify the removal sites, removal quantities and depositing locations and to register acknowledgement by way of documentation or acoustically via a headset (pick by voice).

The technical methods described above used for supplying, order-depositing, conveying-away, indicating and acknowledgement-registering purposes, in some respects, are known per se and belong to order-picking prior art [2]. The innovation is, as illustrated in FIG. 9 to 12, the combination of these material-flow-related and control-related system components with dynamic operational strategies which are not known in this way or for this application. In the order-picking system according to the invention, the novel operational strategies are realized by the system-control means 54, which may be a central order-picking master computer or a store-management system (LVS) combined with decentralized process control [2].

Prior-art order-picking systems are designed for a planned capacity requirement. Geared to the peak requirement, they are divided up into a fixed number of order-picking zones. An order-picking zone here comprises in each case a certain number of providing locations $B_i$ and order-depositing areas $A_i$ and is the region in which one or more order-pickers work.

A fixed number of order-picking zones of in each case one order-picker per zone results in the order-pickers having a full workload only when the system is working to planned capacity. During the rest of the time, non-productive waiting times reduce the efficiency of the system, while there is no possibility of increasing capacity in the case of overloading. This results in long order-processing times.

If a number of order-pickers can work simultaneously in an order-picking zone, it is indeed possible to achieve a higher capacity overall. During peak periods, however, the situations where the order-pickers get in each other's way increase, and the efficiency of the order-pickers thus decreases. This also applies when, as described in [9], an order-picker who does not have a full workload is used temporarily to provide relief in a neighboring zone which is overloaded.

Figure 12:
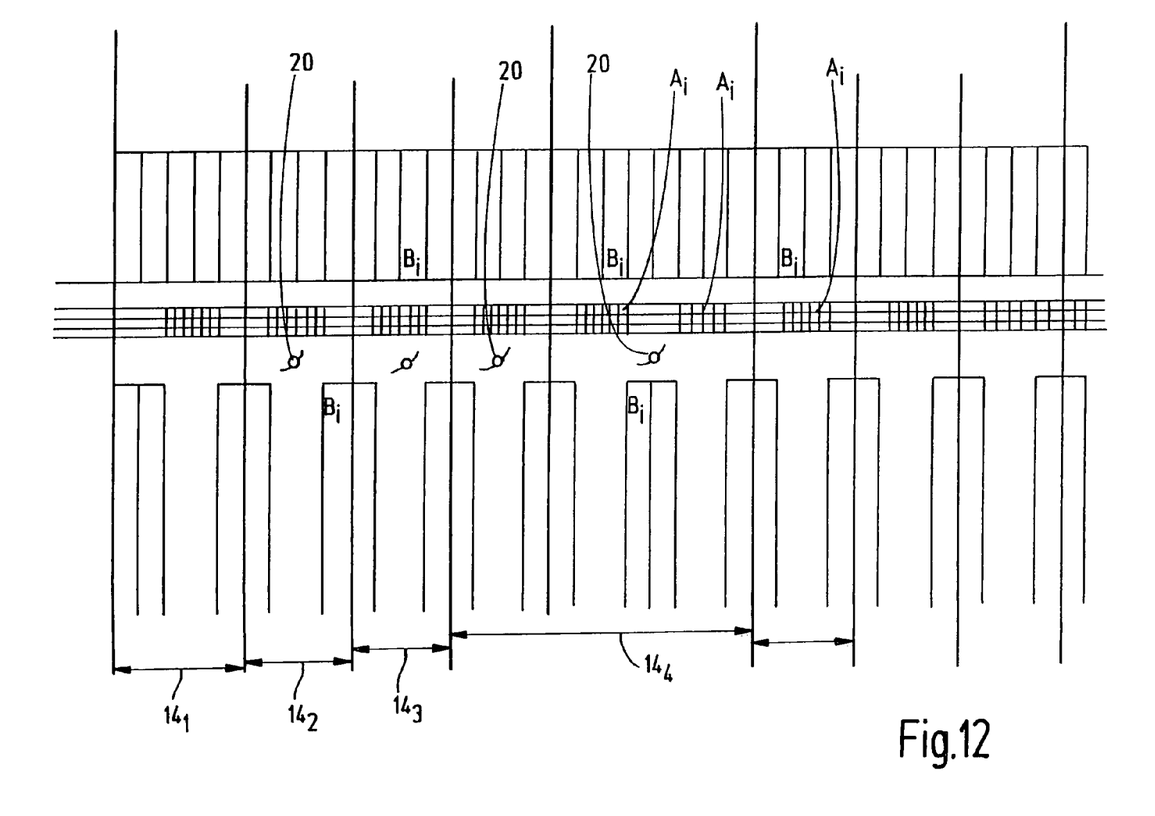
FIG. 12 shows a schematic illustration of a dynamic order-picking zone formation in accordance with the second aspect of the invention.

These disadvantages are avoided by the dynamic operational strategies of the Dynamic Order-Picking System in accordance with the second aspect of the invention, referred to hereinbelow as DOP for short. Dynamic order-picking zone distribution, dynamic supply-location occupancy and/or dynamic order allocation achieve in each case at least one of the following advantages:

- The number of order-picking zones 14 in which in each case one order-picker 20, $K_r$ works is adapted to the current capacity requirement in a self-regulating manner by the system-control means 54 (see FIG. 12). This gives rise to short order-processing times even during peak periods.
- The order-pickers 20, $K_r$ each work in a separate region, which requires only very short distances to be covered, without getting in each other's way and with a uniform and high workload. This minimizes the number of staff required.
- By providing for a clearly allocated order-picking zone 14, ruling out the situation where order-pickers get in each other's way and reducing the risk of mix-ups, it is possible to achieve a minimal error rate and maximum order-picking quality.

In each case one order-picker 20, $K_r$ thus works in an order-picking zone 14 allocated to him in the DOP according to the invention. The number and extent of the order-picking zones and thus the number of order-pickers depend on the current capacity requirement (see FIG. 12). They are determined, using the system-control means, by the Dynamic order-picking zone formation: sufficient adjacent providing locations $B_i$ are combined with sufficient adjacent depositing containers $A_i$, to form an order-picking zone 14, for the sub-orders coming up in the individual zones to provide an order-picker 20, $K_r$ with a full workload.

If the capacity requirement increases to the extent where the order-pickers 20, $K_r$ are overloaded for a relatively long period of time, the number of order-picking zones is increased by 1 and a new zone distribution is carried out. In the case of the capacity requirement constantly dropping, the number of zones is reduced by 1 and redistribution is likewise carried out.

If the capacities of the order-picking zones 14 are utilized on a temporarily non-uniform basis, the boundary between two adjacent zones is shifted, by the system-control means such that uniform utilization of capacity is reestablished.

A constantly uniform workload in the order-picking zones is preferably achieved by the Dynamic supply-location occupancy: in accordance with the popularity monitored by the computer 54, the individual articles are distributed over the providing locations $B_i$ such that the throughputs and the amounts of work coming up in the individual order-picking zones 14 over the course of a day are more or less equal.

If the popularity of an article 26 changes to such a pronounced extent that it disturbs the equilibrium of the throughput distribution by more than, for example, ±5%, the providing location $B_i$ thereof is shifted into another region (order-picking zone). This takes place, without transfer or rearrangement, following removal of the final unit of the stock of articles at the providing location $B_i$ which has been used up to this point.

The third operational strategy of the DOP is geared toward minimizing the times during which the order-pickers have to wait for orders. This is preferably achieved by the Dynamic order allocation: once all the parts of an order which has been completed have exited, the system-control means 54 selects from the order stack, which has been organized in accordance with priority, starting from the most important order, the first order of which the items do not involve any order-picking zone 14 in which less than X % of the depositing containers $A_i$ are free.

The proportion X, which may be, for example, in the region of 10% to 40%, preferably 20%, is a strategy parameter which makes it possible to achieve, along with a minimal number of depositing locations $A_i$, a high workload for the order-pickers 20, $K_r$.

The dynamic order-picking zone distribution means that there are no more or no fewer order-pickers 20, $K_r$ in the system than are currently required. In order to realize this strategy, the system-control means 54 detects or calculates the picking efficiency $\mu_K$ [item/h] of an order-picker 20, $K_r$ in dependence on the size of the order-picking zone 14. The current overall capacity requirement $\lambda_K$ [item/h], which can be calculated from the orders received and in hand, divided by the efficiency per order-picker 20, $K_r$ gives the number of required order-picking zones 14 and order-pickers 20, $K_r$ in accordance with the equation:

$$N_K = [\lambda_K/\mu_K] \text{ROUNDED UP.}$$

If, for example, the overall capacity requirement $\lambda_K$=1350 items per hour and the picking efficiency per order-picker $\mu_K$=250 items per hour, then the number of order-picking zones $N_K$=(1350/250) ROUNDED UP=6.

The dynamic supply-location occupancy achieves the situation where, in an order-picking zone, it is very unlikely that more orders accumulate than there are depositing locations free. For the rare case where this occurs, however, the dynamic order occupancy ensures that the order-pickers in the regions which are not overloaded can work on without any waiting time being required.

The first and the second aspects of the invention correspond to one another in many respects even if different terminology has been selected in a fair number of places. These aspects are thus to be understood as one invention.

What is claimed is:

1. A method of order-picking articles from a number of order-picking zones including a number of providing sections and a corresponding number of order-depositing sections, by a number of order-pickers, the method comprising:

generating zone orders for the order-picking zones using an order-picking computer;

communicating the zone orders to the order-pickers;

collecting articles from the providing sections according to the zone orders; and depositing the articles in the order-depositing sections, wherein each of the order-picking zones respectively comprise one providing section where a certain range of articles is provided and one order-depositing section where articles collected in accordance with one zone order are deposited, thereby forming side-by-side arranged order-picking zones which form an order-picking region, wherein only one respective order-picker collects articles in one of the order-picking zones, wherein the number of order-picking zones is equal to the number of order-pickers, and wherein the order-picking computer sets boundaries which the order-pickers, during the collecting of the articles, cannot cross, between adjacent order-picking zones in a variable manner during the collecting of the articles by means of a zone-allocation strategy thereby adapting at least one of a respective size of the adjacent order-picking zones and the number of the order-picking zones in the order-picking region in reaction to variable order-picking influencing factors.

2. The order-picking method as claimed in claim 1, wherein the order-picking influencing factors include the order-picking efficiency of the individual order-pickers.

3. The order-picking method as claimed in claim 1, wherein the order-picking influencing factors include the number of order-pickers available.

4. The order-picking method as claimed in claim 1, wherein the ranges of articles in the order-picking zones are different and supplement one another to form an overall range.

5. The order-picking method as claimed in claim 4, wherein the order-picking influencing factors include the number of zone orders per unit of time.

6. The order-picking method as claimed in claim 4, further comprising:

receiving customer orders with the order-picking computer;

dividing the customer orders into a third number of zone orders; and prioritizing customer orders according to an order-allocation strategy t of which the zone orders involve order-picking zones where the order-depositing sections are working below average capacity.

7. The order-picking method as claimed in claim 6, wherein the order-allocation strategy is subordinate to the zone-allocation strategy in the manner of a cascade.

8. The order-picking method as claimed in claim 4, further comprising:

evaluating, by the order-picking computer, the popularity of the articles of the overall range by an occupancy strategy; and compiling the ranges of articles of the individual order-picking zones in dependence on the result of this evaluation such that the workloads of the order-pickers are essentially uniform.

9. The order-picking method as claimed in claim 8, further comprising:

assigning, by the order-picking computer, an article to another order-picking zone where the popularity of the article changes such that the workload of the order-picker in the order-picking zone where the article is present changes by more than a certain threshold value in relation to the average workload of the order-pickers.

10. The order-picking method as claimed in claim 8, wherein the zone-allocation strategy is subordinate to the occupancy strategy in the manner of a cascade.

11. The order-picking method as claimed in claim 1, wherein at least one providing section has a through-passage channel, of which the front providing end is arranged in a depositing region of the order-picker.

12. The order-picking method as claimed in claim 11, further comprising:

arranging, in the providing sections, a fourth number of through-passage channels at a rear supply end of a supply aisle.

13. The order-picking method as claimed in claim 12 further comprising:

displacing a storage and retrieval unit in the supply aisle in a controlled manner so that at least some of the articles of the overall range are supplied in an automated manner.

14. The order-picking method as claimed in claim 1, wherein at least one order-depositing section has a fifth number of intermediate-storage containers, which are each designed for receiving at least one article from the range of articles.

15. The order-picking method as claimed in claim 14, wherein a region-specific conveyor is arranged beneath or above the intermediate-storage containers.

16. The order-picking method as claimed in claim 15, further comprising:

selecting, by the order-picking computer, intermediate-storage containers;

opening the selected intermediate-storage containers downwardly in an automated manner thereby releasing the articles stored therein on an intermediate basis on the region-specific conveyor.

17. The order-picking method as claimed in claim 15, wherein the region-specific conveyor comprises a conveying belt.

18. The order-picking method as claimed in claim 16, wherein the region-specific conveyor is oriented parallel to an axis of a line that intersects the depositing regions of the order pickers in the order picking zones.

19. The order-picking method as claimed in claim 15, further comprising:

activating, by the order-picking computer, the region-specific conveyor such that the articles deposited thereon are combined to form a customer order or part of a customer order.

20. The order-picking method as claimed in claim 19, wherein an order-container conveyor is oriented transversely to the region-specific conveyor, and activating includes activating the region-specific conveyor and the order-container conveyor such that the articles deposited on the region-specific conveyor are transferred into an order container positioned on the order-container conveyor.

21. An order-picking apparatus, comprising:

a number of order-picking zones, wherein each of the order-picking zones includes one providing section to provide a range of articles;

a corresponding number of order-depositing sections a number of order-pickers to collect articles from the providing sections and deposit the articles in the order-depositing sections; and an order-picking computer to generate zone orders and to communicate the zone orders to the order-pickers;

wherein the articles are deposited in a formation of the order-picking zones which, form an order-picking region, wherein only one order-picker is situated in each order-picking zone such that the number of order-picking zones is equal to the number of order-pickers, and wherein the order-picking computer is designed to set boundaries between adjacent order-picking zones during the collecting of the articles in a variable manner by means of a zone-allocation strategy to adapt the size of at least one of the order-picking zones in the order-picking region and the number of order-picking zones in the order-picking region according to variable order-picking influencing factors.

* * * * *